United States Patent [19]

Baynes

[11] 4,188,937
[45] Feb. 19, 1980

[54] GRILL FOR COOKING

[75] Inventor: William R. Baynes, DuQuoin, Ill.

[73] Assignee: Turco Manufacturing Co., DuQuoin, Ill.

[21] Appl. No.: 838,545

[22] Filed: Oct. 3, 1977

[51] Int. Cl.² ............................................. A47J 37/00
[52] U.S. Cl. .................................. 126/41 R; 431/192; 431/263
[58] Field of Search ............... 431/263, 264, 191, 192, 431/193, 194; 126/25 B, 41

[56] References Cited

U.S. PATENT DOCUMENTS

| 2,744,569 | 5/1956 | Hoff | 431/263 X |
| 2,850,084 | 9/1958 | Kuhzler | 431/263 |
| 4,035,136 | 7/1977 | Howatt et al. | 431/263 X |

Primary Examiner—Edward G. Favors
Attorney, Agent, or Firm—Rogers, Eilers & Howell

[57] ABSTRACT

A grill for cooking has a gas burner, a gas igniter adjacent that burner, and a piezo electric spark source. The grill has a metal casting; and the igniter has a bracket that mechanically secures and electrically connects that igniter to that casting, and also constitutes one arcing contact of that igniter. One contact of the spark source is electrically connected to the casting; and a wire connects the other contact of that spark source to a second arcing contact of the igniter. A shielding portion of the igniter overlies the confronting ends of the arcing contacts to keep fat, meat juices and other drippings from engaging those confronting ends.

9 Claims, 9 Drawing Figures

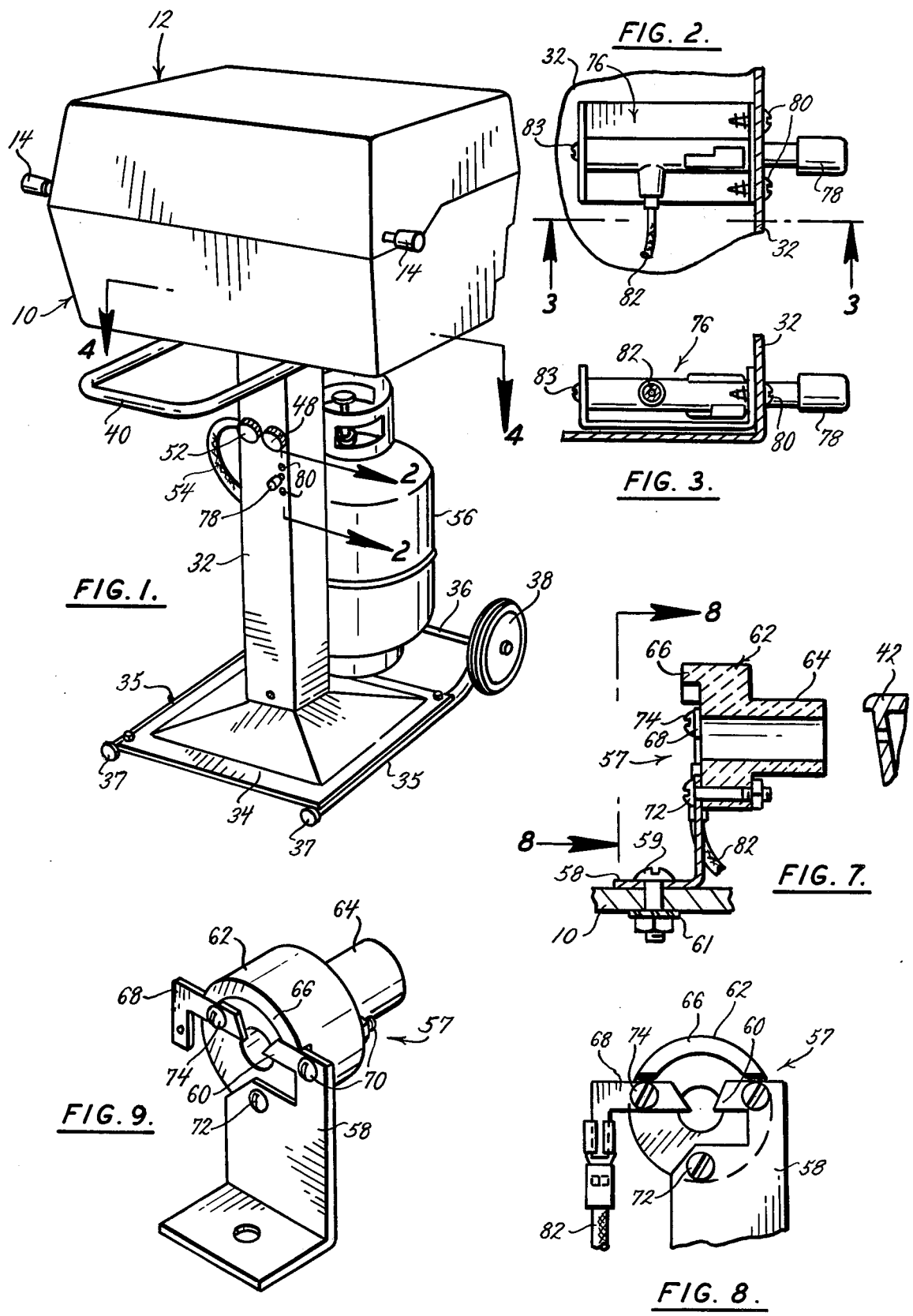

GRILL FOR COOKING

This invention relates to improvements in grills for cooking. More particularly, this invention relates to improvements in igniters for gas-fired burners of grills for cooking.

It is, therefore, an object of the present invention to provide an improved igniter for a gas-fired burner for a grill for cooking.

The igniter provided by the present invention has a bracket that mechanically secures and electrically connects that igniter to the metal casting of a grill for cooking; and that bracket also constitutes one arcing contact of that igniter. One contact of a spark source is electrically connected to the casting; and a wire connects the other contact of that spark source to a second arcing contact of the igniter. A shielding portion of the igniter overlies the confronting ends of the arcing contacts to keep fat, meat juices and other drippings from engaging those confronting ends. It is, therefore, an object of the present invention to provide an igniter for a gas-fired grill for cooking which has two arcing contacts and which has a shielding portion thereof which keeps fat, meat juices and other drippings from engaging the confronting ends of those arcing contacts.

The igniter provided by the present invention has a tubular portion which will conduct admixed gas and air to the confronting ends of the arcing contacts thereof but which will not conduct fat, meat juices and other drippings to those confronting ends. Moreover, the outer end of that tubular portion is disposed so it will not encourage fat, meat juices and other drippings to enter that tubular portion. It is, therefore, an object of the present invention to provide an igniter for a gas-fired grill for cooking which has a tubular portion which will not conduct fat, meat juices and other drippings to the confronting ends of the arcing electrodes thereof and which has the outer end of that tubular portion disposed so it will not encourage fat, meat juices and other drippings to enter that tubular portion.

The arcing contacts of the igniter provided by the present invention are arranged so the upper edges thereof are horizontal. As a result, even if any fat, meat juices and other drippings were to fall onto the outer ends of those arcing contacts, that fat, meat juices and other drippings would not be directed toward the confronting ends of those arcing contacts. It is, therefore, an object of the present invention to provide an igniter which has the upper edges of the arcing contacts thereof arranged so they are horizontal.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only and do not limit the invention and that the invention will be defined by the appended claims.

BRIEF DESCRIPTION OF THE DRAWING

In the drawing,

FIG. 1 is a perspective view of a portable gas-fired grill in which the said preferred embodiment of the present invention is incorporated, FIG. 2 is a sectional view, on a larger scale, through a portion of the leg-like support of that grill, and it is taken along the plane indicated by the line 2—2 in FIG. 1, FIG. 3 is another sectional view, on the scale of FIG. 2 of a portion of the leg-like support of the grill of FIG. 1, and it is taken along the plane indicated by the line 3—3 in FIG. 2, FIG. 7 is a sectional view, on the scale of FIG. 6, of the igniter shown in FIG. 4, and it is taken along the plane indicated by the line 7—7 in FIG. 4, FIG. 8 is an elevational view, on the scale of FIG. 7, of the left-hand end of the igniter shown in FIG. 7, and FIG. 9 is a perspective view, on the scale of FIG. 7, of the igniter of FIG. 7,

DETAILED DESCRIPTION OF PREFERRED EMBODIMENT

Figure 5:
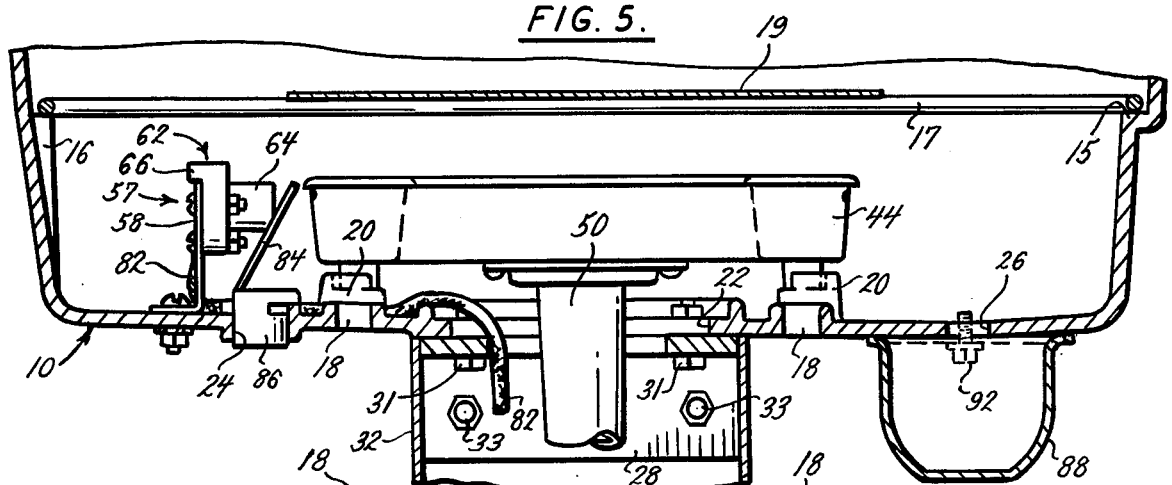
FIG. 5 is a sectional view through the section of the grill shown in FIG. 4, and it is taken along the broken plane indicated by the broken line 5—5 in FIG. 4.

Referring to the drawing in detail, the numeral 10 generally denotes an aluminum casting which constitutes the lower section of a two-section gas-fired grill; and the numeral 12 generally denotes an aluminum casting which constitutes the upper section of that grill. The rear edges of the sections 10 and 12 are interconnected by hinges, not shown. The numeral 14 denotes two handles which are secured to the forward portion of the upper section 12 to facilitate the pivoting of that upper section about the hinges at the rear edges of the sections 10 and 12.

The numeral 15 denotes a ledge which extends along the inner face of the rear wall of the casting 10; and the numeral 16 denotes vertically-directed supporting ribs 16 at the inner face of the front wall of that casting. The numeral 17 denotes a grate which rests upon, and which is supported by, the ledge 15 and the ribs 16; and that grate supports heat-resistant lava rocks or the like, not shown. Further ledges, not shown, are provided at a higher level at the inner faces of the front and rear walls of the casting 10; and those further ledges will support a cooking grill, not shown. The heat-resistant lava rocks tend to provide good distribution of heat for any food which is cooked on the grill.

Figure 4:
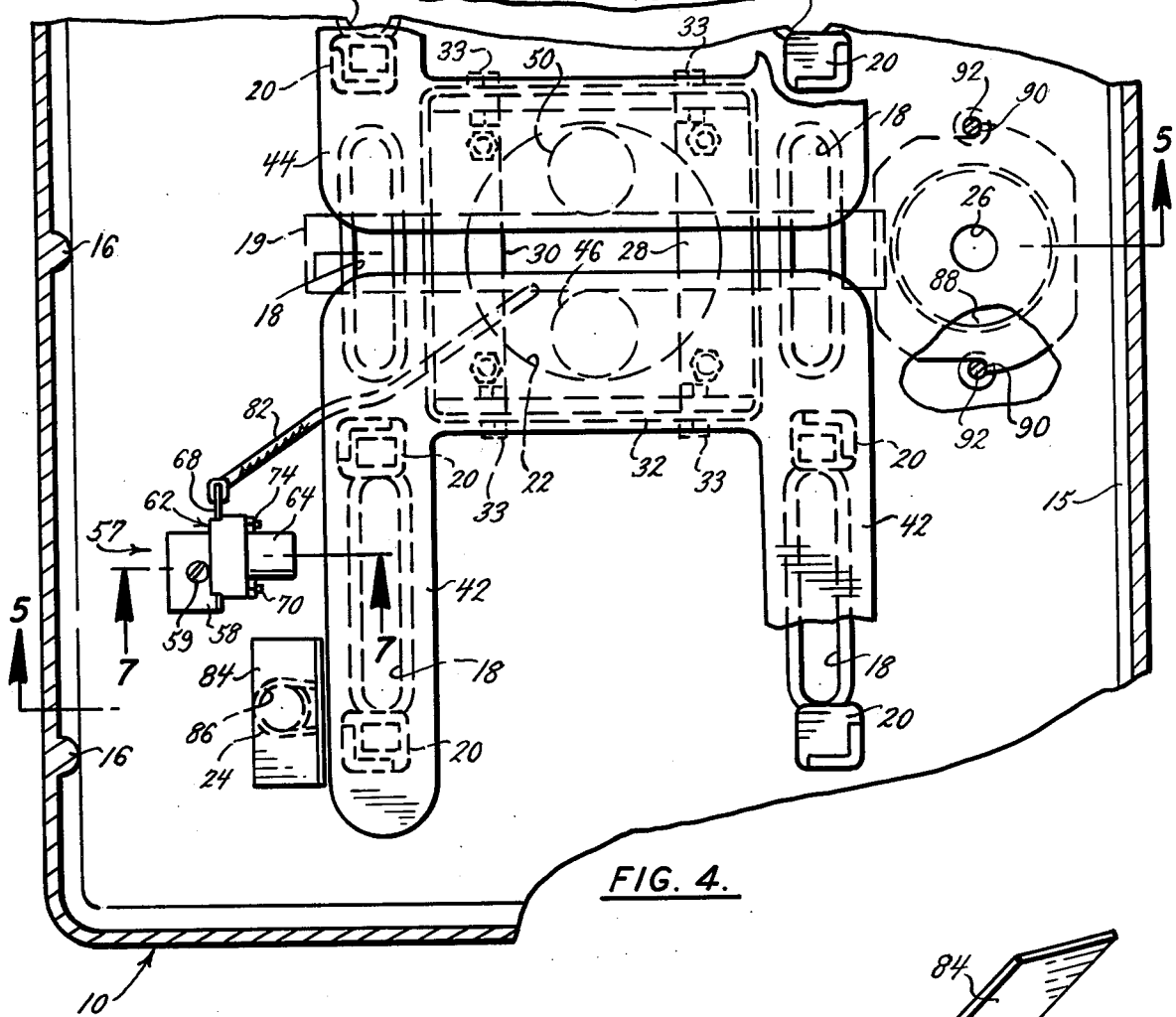
FIG. 4 is a sectional view, on a scale intermediate those of FIGS. 1 and 2, of the burner-containing section of the grill of FIG. 1, and it is taken along the plane indicated by the line 4—4 in FIG. 1.
Figure 6:
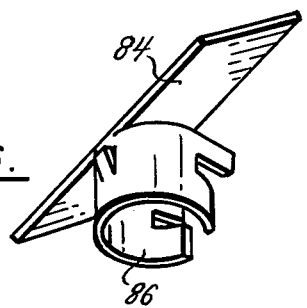
FIG. 6 is a perspective view, on a still larger scale, through a portion of a deflector for fat, meat juices, and other drippings.

The numeral 18 denotes six elongated ventilation slots in the bottom of the casting 10. As indicated particularly by FIG. 4, three of those ventilation slots are arranged in tandem to define a straight line; and three further of those ventilation slots are arranged in tandem to define a second straight line which is parallel to, but which is displaced laterally from the first straight line. The numeral 20 denotes bosses which are located on the two lines which are defined by the elongated ventilation slots 18; and those bosses are adjacent the ends of some of those ventilation slots. Those bosses underlie and support the feet of U-shaped gas burners 42 and 44. As indicated by FIGS. 4 and 5, those burners overlie the endmost ventilation slots and the central portions of the central ventilation slots. A deflector plate 19 is secured to, and supported by, the grate 17; and it overlies the central portions of the central ventilation slots, as indicated by FIGS. 4 and 5. That deflector plate and the burners 42 and 44 will keep fat, meat juices and other drippings from reaching, and following through, the ventilation slots 18.

The numeral 22 denotes a central opening in the bottom of the casting 10; and that opening is overlain by portions of deflector plate 19 of burners 42 and 44. That opening is circular, as shown particularly by FIG. 4. A touch hole 24 is provided in the bottom of the casting 10, as shown particularly by FIG. 5; and that touch hole is close to one arm of the burner 42, as shown by FIGS. 4 and 5. That touch hole is provided for grills which will not be equipped with the igniter of the present invention.

The numeral 26 denotes a pump opening in the bottom of the casting 10; and that opening is at the right-hand sides of FIGS. 4 and 5. Whenever the gas grill of FIG. 1 is set on a horizontal surface, the casting 10 will have most portions of the bottom thereof sloping downwardly toward that opening.

The numeral 28 in FIG. 5 denotes an inverted U-shaped bracket which has a rectangular opening 30 therein. That opening communicates with, but differs in size and shape from, the opening 22 in the bottom of the casting 10. Fasteners 31, such as bolts and nuts, secure the bracket 28 to the casting 10. The numeral 32 denotes a leg-like support which is tubular and which has a square cross section. The upper end of that support receives the arms of the inverted U-shaped bracket 28; and fasteners 33, such as bolts and nuts, maintain that support, that bracket and the casting 10 in assembled relation.

The numeral 34 denotes a base plate to which the support 32 is solidly secured. An axle 36 is supported by rod-like extensions 35 of the base plate 34. Cup-like tips 37, of an elastomeric material, are mounted on the forward ends of the extensions 35; and those tips will keep those forward ends from marring the surface of a patio or of the floor of an outdoor porch. Also, those tips will provide a desirable frictional resistance to movement of the forward ends of those extensions relative to such a surface. Wheels 38 are rotatably secured to opposite ends of the axle 36 to facilitate movement of the grill from one place to another. A handle 40 underlies, and is secured to the casting 10; and that handle can be used to raise the tips 37 upwardly and also to guide the grill as it is moved from one place to another.

The numeral 46 denotes a pipe which is secured to, and which extends downwardly from, the burner 42; and the numeral 48 denotes a manually-operated valve which is mounted within the leg-like support 32 and which controls the introduction of gas into the pipe 46. The numeral 50 denotes a second pipe which is secured to, and which extends downwardly from, the burner 44; and the numeral 52 denotes a second manually-operated valve which is mounted within the leg-like support 32 and which controls the introduction of gas into the pipe 50. The numeral 56 denotes a gas "bottle" which rests upon the base plate 34, and in which a liquified petroleum gas such as propane or methane is held under pressure. The numeral 54 denotes a gas line which extends from that "bottle" to a header, not shown, within the leg-like support 32 that supplies gas to the valves 48 and 52.

Most hereinbefore-numbered elements of the drill of FIG. 1 are found in prior grills. Consequently, those elements are not, per se, parts of the present invention.

The numeral 57 generally denotes one preferred embodiment of gas igniter which is provided by the present invention; and that igniter has an L-shaped stainless steel bracket 58 which has an arcing contact 60 at the upper end thereof. An opening in the foot of that bracket is disposed in register with an opening in the bottom of the casting 10; and then the shank of the bolt of a nut and bolt combination 59 is passed downwardly through those openings, all as shown by FIG. 7. A star washer 61 is telescoped over the exposed portion of the shank of that bolt; and then the nut of that bolt and nut combination is threaded onto that shank and tightened. The tightening of the nut and bolt combination 59 forces the points of the star washer 61 to "bite" into the aluminum of the casting 10; and hence assures a good electrical connection between that casting and that star washer. The tightening of that nut and bolt combination also assures good electrical connections between that star washer and that nut and bolt combination, between that nut and bolt combination and the foot of the bracket 58, and between that foot and the upper surface of the casting 10.

The numeral 62 denotes a ceramic support which is part of the igniter 57 and which has a tubular portion 64 and a shielding portion 66. The numeral 68 denotes a stainless steel arcing contact which is disposed in register with, but which is spaced laterally from, the arcing contact 60 on the L-shaped bracket support 58. A nut and bolt combination 70, and a further nut and bolt combination 72, fixedly secure the ceramic support 62 to the L-shaped bracket 58. A nut and bolt combination 74 secures the arcing contact 68 to that ceramic support. As indicated particularly by FIGS. 7 and 9, the shielding portion 66 of the ceramic support 62 overlies the confronting ends of the arcing contacts 60 and 68; and that portion will keep fat, meat juices, and other drippings from falling onto the confronting ends of those arcing contacts. It should also be noted that the upper edges of the arcing contacts 60 and 68 are horizontal; and hence any fat, meat juices and other drippings which might fall onto the outer ends of those arcing contacts would not tend to flow inwardly toward the confronting ends of those arcing contacts. Moreover, it should be noted that the upper edges of the arcing contacts 60 and 68 are disposed so close to the under surface of the shielding portion 66 that any fat, meat juices and other drippings which might fall onto the outer ends of those arcing contacts and which might tend to flow inwardly toward the confronting ends of those arcing contacts would be intercepted and stopped by that shielding portion. All of this means that regardless of the amount of fat, meat juices and other drippings which might fall downwardly toward the arcing contacts 60 and 68, the confronting ends of those arcing contacts will not become fouled by any of that fat, meat juices and other drippings.

Whenever the base plate 34 of the grill is set on a flat, level surface, the axis of the tubular portion 64 of the ceramic support 62 will be horizontal. This is desirable; because it will tend to keep fat, meat juices and other drippings from engaging and lodging upon the lower edge of the front of that tubular portion. Further, because the axis of that tubular portion will be horizontal, any fat, meat juices and other drippings which happened to splash or otherwise be deflected into that tubular portion would not tend to flow rearwardly and approach the confronting ends of the arcing contacts 60 and 68. Further, it should be noted that the lower edges of those arcing contacts are disposed well above the lower surface of the interior of the tubular portion 64;

and hence even if some fat, meat juices and other drippings were to lodge on the lower portion of the leading edge of the front of that tubular portion, were to flow toward the rear of that tubular portion, and were to reach the rear edge of that tubular portion, that fat, meat juice and other drippings could not engage the confronting ends of the arcing contacts 60 and 68.

Although the L-shaped bracket 58 will dispose the axis of the tubular portion 64 so it is horizontal whenever the base plate 34 is set on a flat, level surface, it is recognized that some users of the grill will not always set that base plate on a flat, level surface. As a result, the axis of the tubular portion 64 may not always be perfectly horizontal. However, no perceptible amounts of fat, meat juices and other drippings will be able to enter the tubular portion 64 and flow rearwardly toward the rear edge thereof, even if the axis of that tubular portion is displaced upwardly above the horizontal, as long as the product of the inner diameter of that tubular portion times the cosine of the angle between the horizontal and the axis of that tubular portion is less than one-half of the diameter of a drop of the fat, meat juices or other drippings. Where the inner diameter of the tubular portion 64 is three-eighths of an inch, the angle between the horizontal and the axis of that tubular portion should not exceed twelve degrees.

The numeral 76 denotes a piezoelectric spark source which is of standard and usual design. That source is mounted within the leg-like support 32 by self-tapping screws 80, as shown particularly by FIGS. 1–3. A push button 78, at the outer end of the plunger of that source, is readily accessible to the operator of the grill.

A screw 83 grounds one electrode of the source 76 to the U-shaped metal frame of that source; and the screws 80 ground that frame to the leg-like support 32. The fasteners 33 and 31 and the inverted U-shaped bracket 28 ground the casting 10 to that leg-like support; and hence a good electrical path is provided between that one electrode and the arcing contact 60 of the igniter 57. The numeral 82 denotes a conductor which extends from the other electrode of the source 76 to the arcing contact 68, as indicated by FIGS. 4, 5, 7 and 8. That conductor is covered by a temperature-resistive electrically-insulative material. As indicated particularly by FIG. 5, that conductor is directed outwardly and downwardly from the arcing contact 68, and it is caused to rest upon the bottom of the casting 10 until it is passed downwardly through the openings 22 and 30 into the leg-like support 32. By being directed outwardly and downwardly from the arcing electrode 68 and by being caused to lie on the relatively-cool bottom of the casting 10, the conductor 82 has the temperature of the insulation thereon kept well below the temperature at which that insulation could be impaired by heat.

The numeral 84 denotes a deflector which has a split-ring retainer 86. As indicated particularly by FIG. 5, that split-ring retainer is disposable within the touch hole 24. The unstressed diameter of that split-ring retainer is larger than the inner diameter of that touch hole; and hence that split-ring retainer must be compressed to cause it to fit within that touch hole. Once that split-ring retainer has been set within that touch hole, the restorative forces in that split-ring retainer will effectively hold that deflector in position relative to the casting 10. After the split-ring retainer is disposed within the touch hole 24, the upper portion of the deflector 84 will be set at an angle which will enable that upper portion to fully overlie and protect the touch hole 24, as indicated by FIG. 4. In this way, fat, meat juices and other drippings will be kept from reaching, and passing through, the touch hole 24; and hence fat, meat juices and other drippings will be kept from soiling the surface of a patio or of the floor of an outdoor porch.

The numeral 88 denotes a grease cup which has a flat annular flange at the top thereof. Abutments 90 are provided on that flange, as indicated particularly by FIG. 4. Shouldered screws 92 are seated in threaded openings in the bottom of the casting 10; and the abutments 90 plus the portions of the flange of the cup 88 which are immediately adjacent them will overlie the shoulders on those screws to hold the cup 88 in register with the sump opening 26. Whenever sizeable amounts of fat, meat juices and other drippings accumulate in the cup 88, the user of the grill can loosen the screws 92, remove the cup 88, empty it, replace it, and tighten those screws.

In using the grill provided by the present invention, the operator will dispose the wheels 38 and the tips 37 on as flat and level a surface as possible. Thereafter, he or she will grasp one of the handles 14 and move the casting 12 to its open position. The valve 48 will then be opened; and gas will issue from the jets of the burner 42. That gas will expand and will mix with air; and some of the admixed gas and air will pass through the tubular portion 64 of the ceramic support 62 and reach the arcing contacts 60 and 68. The flow of admixed gas and air will be almost immediate; and hence soon as the operator of the grill has opened the valve 48, he or she can press the push button 78. The resulting arc between the arcing contacts 60 and 68 will ignite the admixed gas and air. Once the burner 42 has become fully lighted, the valve 52 can be opened; and then the admixed gas and air from the burner 44 will be lighted by the flames from the burner 42.

The grill of FIG. 1 is a portable grill; but the present invention is just as useful with a stationary grill as with a portable grill. The grill of FIG. 1 is shown with two burners; but the present invention is just as useful with a grill that has just one burner as it is with a grill that has two burners.

The shielding portion 66 of the ceramic support 62 is shown as a convexo-concave projection at the upper portion of the rear surface of that ceramic support. If desired, however, that shielding portion could be given many different forms and shapes. For example, it could be made as a convexo-planar projection at the upper portion of the rear surface of the support 62 with its convex surface flush with the convex upper surface of that support. In addition, the shielding portion 66 could be made as part of a planar rear surface, of the ceramic support 62, which had a deep, horizontally-directed groove formed therein to accommodate the arcing contacts 60 and 68. In the latter event, the arcing contacts 60 and 68 would be disposed forwardly of the plane of the vertical leg of the bracket 58 to be in the groove and thus be overlain and shielded by the upper portion of that rear surface; and that leg would abut the lower portion of that rear surface.

The casting 10 is shown with six ventilation slots 18; but that casting could be made with more or fewer ventilation slots. Further, those ventilation slots could be given different configurations and orientations.

Whereas the drawing and accompanying description have shown and described a preferred embodiment of the present invention it should be apparent to those skilled in the art that various changes may be made in the form of the invention without affecting the scope thereof.

What I claim is:

1. An igniter for a burner of a gas-fired grill which comprises a support that is adjacent said burner, a heat-resistant member which is held by said support so it is intermediate said support and said burner, and a plurality of arcing contacts that are secured to said heat-resistant member and that are spaced apart to define an arc gap therebetween, said arcing contacts being secured to said heat-resistant member at points which are remote from said burner, said heat-resistant member having a closed-top passage which is formed and disposed to permit admixed air and gas from said burner to reach said arcing contacts but not to cause any fat, meat juices or other drippings from food on said grill to move into proximity to said arcing contacts, said heat-resistant member having a shielding portion that projects axially rearwardly of said closed-top passage to overlie the confronting ends of said arcing contacts to keep fat, meat juices and other drippings from food on said grill from dripping onto said confronting ends of said arcing contacts.

2. An igniter as claimed in claim 1 wherein one of said arcing contacts is an integral part of said support, whereby said support can be used as part of the electrical path from an arc source for said igniter to said one arcing contact, and thereby obviates the need of extending a connecting wire to said one arcing contact.

3. An igniter as claimed in claim 1 wherein the upper edges of said arcing contacts are so oriented relative to the horizontal that those upper edges would not cause any fat, meat juices or other drippings from food on said grill, that fell onto those arcing contacts, to move into proximity to said confronting ends of said arcing contacts.

4. An igniter for a burner of a gas-fired grill which comprises a support that is adjacent said burner, a heat-resistant member which is held by said support so it is intermediate said support and said burner, and a plurality of arcing contacts that are secured to said heat-resistant member and that are spaced apart to define an arc gap therebetween, said arcing contacts being secured to said heat-resistant member at points which are remote from said burner, said heat-resistant member having a closed-top passage which is formed and disposed to permit admixed air and gas from said burner to reach said arcing contacts but not to cause any fat, meat juices or other drippings from food on said grill to move into proximity to said arcing contacts, said heat-resistant member having a shielding portion that projects axially rearwardly of said closed-top passage to overlie the confronting ends of said arcing contacts to keep fat, meat juices and other drippings from food on said grill from dripping onto said confronting ends of said arcing contacts, the upper edges of said arcing contacts being so close to said shielding portion that said shielding portion would intercept and halt any fat, meat juices and other drippings from food on said grill that dripped onto said upper edges of said arcing contacts and that tended to move into proximity to said confronting ends of said arcing contacts.

5. An igniter as claimed in claim 1 wherein said heat-resistant member is tubular to define said closed-top passage therethrough, and wherein the axis of said closed-top passage is close to the horizontal.

6. An igniter as claimed in claim 1 wherein said heat-resistant member is tubular to define said closed-top passage therethrough, and wherein the product of the inner diameter of that tubular portion times the cosine of the angle between the horizontal and the axis of that tubular portion is less than one-half of the diameter of a drop of the fat, meat juices or other drippings.

7. An igniter as claimed in claim 1 wherein said heat-resistant member is tubular, and wherein that end of said heat-resistant member which is adjacent said burner tends to keep fat, meat juices and other drippings from food on said grill from lodging on said end of said heat-resistant member.

8. An igniter for a burner of a gas-fired grill which comprises a support that is adjacent said burner, a heat-resistant member which is held by said support, and a plurality of arcing contacts that are secured to said heat-resistant member and that are spaced apart to define an arc gap between the confronting ends thereof, the rear surfaces of said confronting ends of said arcing contacts coacting to define a plane which is closer to being vertical than it is to being horizontal, said heat-resistant member having a shielding portion that projects rearwardly beyond said plane and beyond said rear surfaces of said confronting ends of said arcing contacts to overlie said confronting ends of said arcing contacts to keep fat, meat juices and other drippings from food on said grill from dripping onto said confronting ends of said arcing contacts, said arcing contacts having the upper edges thereof so oriented relative to the horizontal that those upper edges would not cause any fat, meat juices or other drippings from food on said grill that fell onto those arcing contacts to move into proximity to said confronting ends of said arcing contacts.

9. An igniter for a burner of a gas-fired grill which comprises a support that is adjacent said burner, a heat-resistant member which is held by said support, and a plurality of arcing contacts that are secured to said heat-resistant member and that are spaced apart to define an arc gap between the confronting ends thereof, the rear surfaces of said confronting ends of said arcing contacts coacting to define a plane which is closer to being vertical than it is to being horizontal, said heat-resistant member having a shielding portion that projects rearwardly beyond said plane and beyond said rear surfaces of said confronting ends of said arcing contacts to overlie said confronting ends of said arcing contacts to keep fat, meat juices and other drippings from food on said grill from dripping onto said confronting ends of said arcing contacts, said upper edges of said arcing contacts being so close to said shielding portion that said shielding portion would intercept and halt any fat, meat juices and other drippings from food on said grill that dripped onto said upper edges of said arcing contacts and that tended to move into proximity to said confronting ends of said arcing contacts.

* * * * *